No. 738,217. PATENTED SEPT. 8, 1903.
H. T. LOVE.
NUT AND WASHER.
APPLICATION FILED JULY 6, 1903.
NO MODEL.
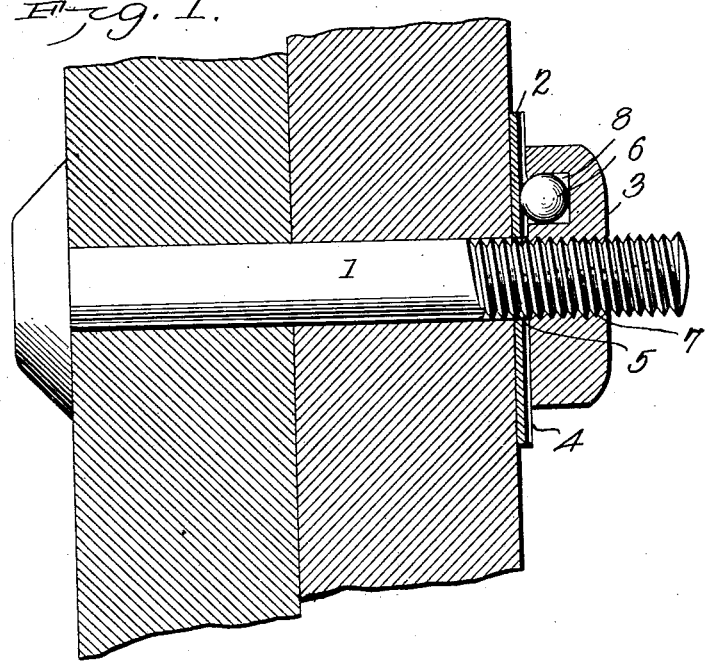
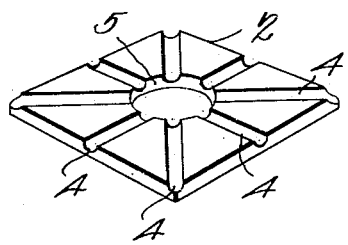
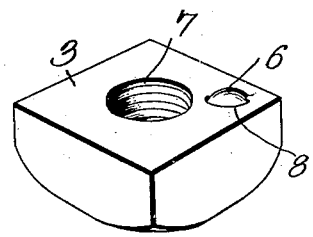
Witnesses
H. T. Love, Inventor.
by C. A. Snow & Co.
Attorneys No. 738,217. Patented September 8, 1903.

UNITED STATES PATENT OFFICE.

HARRY T. LOVE, OF BROOKVILLE, PENNSYLVANIA.

NUT AND WASHER.

SPECIFICATION forming part of Letters Patent No. 738,217, dated September 8, 1903.

Application filed July 6, 1903. Serial No. 164,464. (No model.)

*To all whom it may concern:*

Be it known that I, HARRY T. LOVE, a citizen of the United States, residing at Brookville, in the county of Jefferson and State of Pennsylvania, have invented a new and useful Nut and Washer, of which the following is a specification.

My invention relates to lock-nuts and washers for use therewith, and has for its object to produce a device of this character of simple construction which will be efficient in operation and one in which the nut will when brought to bear upon the washer be securely locked thereto and prevented from accidental turning.

To these ends the invention comprises the novel details of construction and combination of parts more fully hereinafter described.

In the accompanying drawings, Figure 1 is a longitudinal sectional elevation centrally through a bolt having my improved nut and washer applied thereto. Fig. 2 is a perspective view of the washer. Fig. 3 is a similar view of the nut viewed from beneath.

Referring to the drawings, 1 indicates a bolt of ordinary character, to which is applied a washer 2 and nut 3, embodying my invention. The washer 2 has formed in its upper active face a series of radial grooves or recesses 4, which preferably extend from its central bolt-receiving opening 5 to its periphery. The nut 3 has provided upon its lower active face, which in practice bears upon the upper active face of the washer, a stud or projection 6, which is preferably disposed between the central bolt-receiving opening 7 and one corner of the nut. This stud or projection 6, which in practice engages one of the radial grooves 4 of the washer for locking the nut against backward rotation, may be formed in any suitable manner, but preferably consists, as herein shown, of a small metal ball seated in an opening or socket 8, formed in the nut by drilling or otherwise, the ball being retained by pinching the metal at the mouth of the socket downward upon the ball, as shown in Fig. 1. This method of forming the projection upon the nut is highly desirable not only because of its simplicity and inexpensiveness, but also because of its ready application to the nuts during the course of manufacture or to such devices now in general use, it being understood that as nuts are generally formed from cold-wrought metal the formation of a stud or projection thereon prior to my invention entailed material trouble and expense. While I prefer to employ a metal ball, as herein shown, because of its inexpensiveness and the fact that it would not require to be especially manufactured for the purpose, it is to be understood that other forms of members—such, for example, as a metal pin—might be employed in lieu of the ball and that such a change would be within the scope of my invention. It is also to be understood that in practice the same results could be obtained by applying the member 6 to the washer and forming the radial grooves in the adjacent active face of the nut, or that in some cases where the employment of a washer is unnecessary or undesirable the radial grooves might be formed directly in the surface of the member against which the nut would bear and the same result be attained. Hence such changes would not amount to a departure from my invention.

In practice the nut will be screwed downward upon the bolt, as usual, and the member 6 will travel over the face of the washer while the nut is being tightened and will when the latter is brought to rest engage in one of the grooves to prevent retrograde movement of the nut, as above described and as will be readily understood, it being obvious, of course, that the washer will be fixed against turning in some suitable manner.

From the foregoing it will be seen that I provide a simple device which is admirably adapted for the attainment of the ends in view and that I do not limit myself to the precise details herein set forth, inasmuch as minor changes may be made without departing from the spirit of the invention.

Having thus described my invention, what I claim is—

1. The combination with a nut, of a member against which the same abuts, one of said parts having a series of grooves formed in its active face and the other having its adjacent face provided with a socket, and a ball seated in the socket.

2. The combination with a nut provided in its active face with a socket, of a ball seated in the socket, and a washer having a series of grooves formed in its active face for engagement by the ball.

In testimony that I claim the foregoing as my own I have hereto affixed my signature in the presence of two witnesses.

HARRY T. LOVE.

Witnesses:
  LILLIAN SNYDER,
  PERRY B. LOVE.